Figure 1:
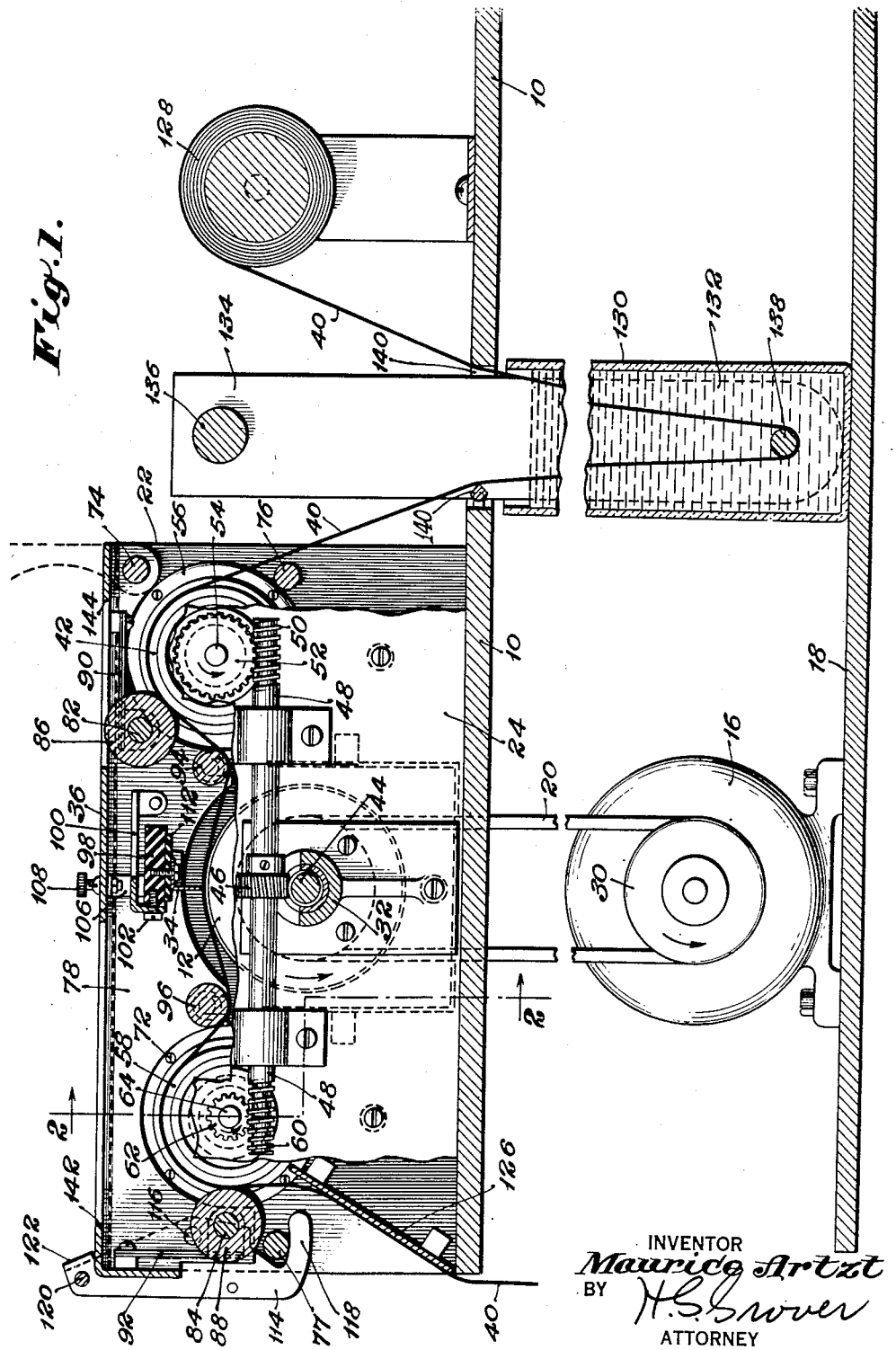

Dec. 25, 1945.   M. ARTZT   2,391,765
FACSIMILE APPARATUS
Filed Sept. 21, 1942   2 Sheets-Sheet 1

INVENTOR
*Maurice Artzt*
BY
*H. S. Snover*
ATTORNEY

Dec. 25, 1945.  M. ARTZT  2,391,765

FACSIMILE APPARATUS

Filed Sept. 21, 1942  2 Sheets-Sheet 2

INVENTOR
Maurice Artzt
BY H.G. Grover
ATTORNEY

Patented Dec. 25, 1945

2,391,765

UNITED STATES PATENT OFFICE 2,391,765

FACSIMILE APPARATUS

Maurice Artzt, Haddonfield, N. J., assignor to Radio Corporation of America, a corporation of Delaware Application September 21, 1942, Serial No. 459,137

6 Claims. (Cl. 234—70)

This invention relates to an improvement in facsimile systems, and, more particularly, to an improvement in facsimile receivers of the wet, or electrolytic, type.

One form of a facsimile receiver is that in which electrolytic recording is employed, the record being produced on a moist record receiving paper by electrolytic action. On such a receiver an azo dye or some other marking is produced in the paper or on the surface thereof due to the conduction of an electric current therethrough, the intensity of the marking corresponding to the intensity of the current passed through the paper.

In electrolytic recording, the pretreated or impregnated paper is passed through the receiving apparatus, where it is subjected to a scanning action by a rotating helix, or other similar means, and during the scanning action, line elements of the paper are subjected to current or potential variations, in order to produce the recording. Naturally, in order for the paper to be capable of conducting current, it must have a certain amount of moisture contained therein, but on the other hand, it is desirable that the paper not contain too much moisture, since in the latter case the copy might be impaired due to streaking or running of colors or markings.

Somewhat critical control of the moisture content of the paper is therefore desirable, or, on the other hand, some means must be provided whereby paper containing the proper amount of moisture will not have its moisture content altered during transmission of the impregnated paper from the supply roll to the recording point.

The impregnated paper may be supplied to the receiver from a pretreated or pre-impregnated roll having the proper moisture content, as, for example, in Young application Serial No. 420,917, filed November 29, 1941. On the other hand, a supply of untreated or unimpregnated paper may be affixed within the receiving apparatus, the paper being permitted to pass through an impregnating bath before ultimately reaching the recording point.

For commercial adaptations of facsimile receivers, it is desirable that the machine be relatively simple in its operation, and that maintenance of the machine be relatively simple. It is also desirable that the manner in which the machine is threaded for operation be simple and practical, so that inexperienced persons will not have difficulty in properly threading the machine in order to obtain the best possible services from the machine, and in order to prevent any possibility of tearing the paper while the recording is being made.

It is also desirable in facsimile receivers where the paper is impregnated at the machine to have a simple mechanism for directing the paper through the impregnating electrolyte.

When electrolytic recordings are made, it is necessary that the paper contain a certain amount of moisture in order that a current may be conveniently and readily passed through the paper in varying degrees, in order to reproduce the desired markings. As pointed out above, the amount of moisture that the paper should contain at the time the paper is subjected to the recording currents is relatively important, with the result that it is desirable to have some means for regulating the amount of moisture contained in the paper at the time the recording is made. For this purpose a heater is provided for driving off a controllable amount of moisture, the heater being positioned between the impregnating bath or the supply roll and the recording electrodes. Naturally, since no moisture can be conveniently added to the paper, the paper, after leaving the electrolyte bath, is wetter than is normally required so that some predetermined amount of moisture can be driven off in order that the paper may contain the proper degree of moisture at the time it reaches the recording point.

After a recording has been made on the paper, the paper still contains a certain amount of moisture. Since it is not desirable that the paper emerge from the machine while in a moist condition, the present invention provides electrical means for drying the paper immediately after a recording has been placed on the paper, and for ironing the paper simultaneously with the drying operation.

It is, therefore, one purpose of the present invention to provide in a facsimile receiver or duplicator, a simplified arrangement for controlling the amount of moisture contained in the paper at the time the recording is made.

Another purpose of the present invention resides in the provision of means whereby an overly moist electrolytic recording paper can be partially dried in order that the resultant moisture content of the paper will be proper in order to produce desirable and satisfactory electrolytic facsimile recordings.

Still another purpose of the present invention resides in the provision of means for completely drying the paper after a recording has been placed thereon, in order that the recordings may emerge from the receiver or recording apparatus in a dry condition.

Still another purpose of the present invention resides in the provision of means in an electrolytic facsimile receiver whereby the paper, as it emerges from the receiver or recorder, is dried and simultaneously iron flat in order that no wrinkles will remain in the paper, and in order that the paper will not have a "crepe" surface.

A still further purpose of the present invention resides in the provision of an arrangement whereby the heater means for controlling the moisture content, as well as the heater for subsequently drying the recording, are both conveniently located within rotating drums such as are normally associated with facsimile receiving apparatuses.

Figure 2:
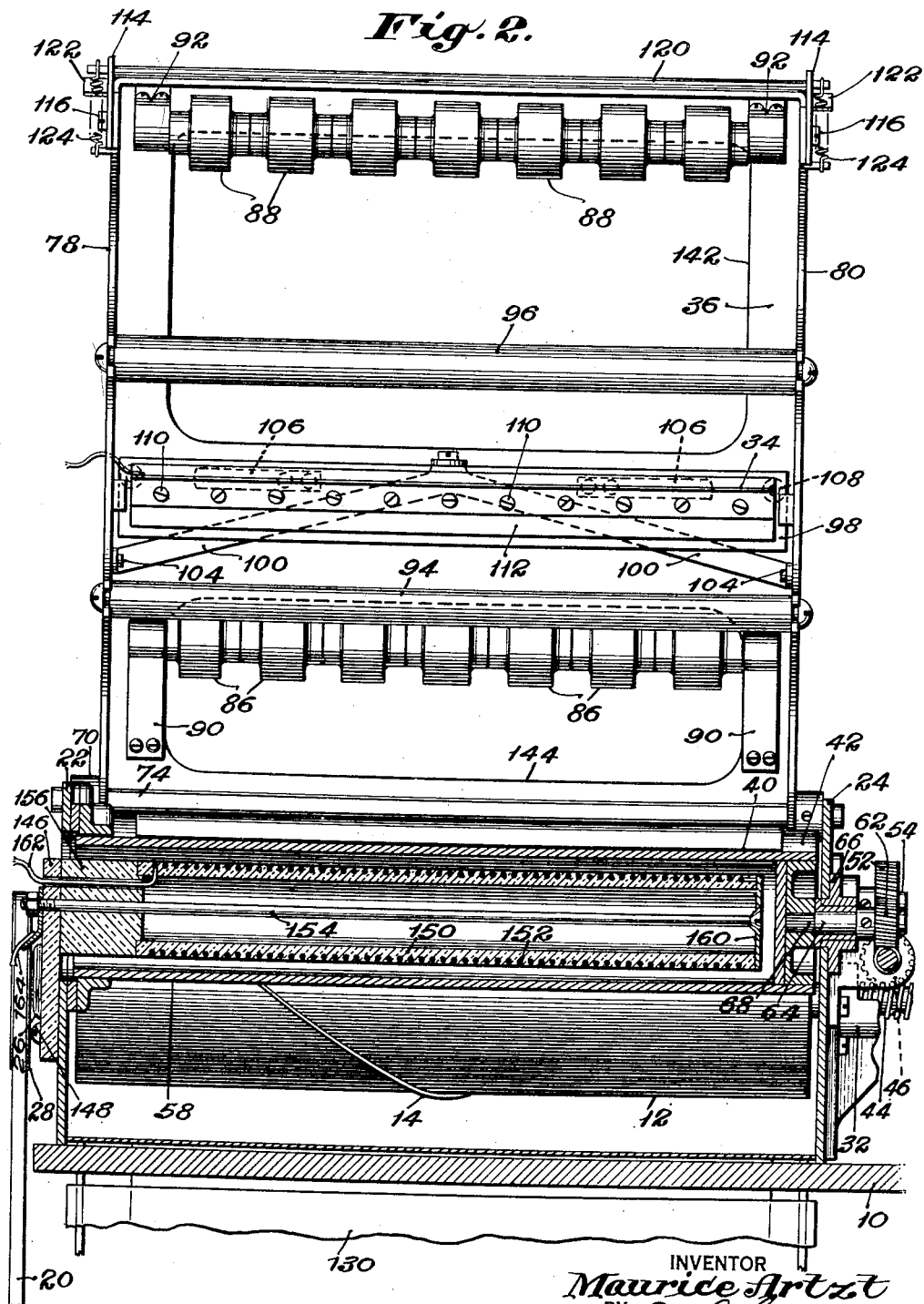

Various other purposes and advantages of the present invention will become more apparent to those skilled in the art upon the following detailed description, particularly when considered in connection with the drawings, wherein like reference numerals represent like parts, and wherein Figure 1 shows an end view of a preferred form of the present invention, with certain portions of the facsimile receiver shown in section in order to facilitate in illustrating the invention, and Figure 2 shows a section of the receiver mechanism taken along section lines 2—2 in Figure 1, the apparatus in Figure 2 being shown with the cover member in an open position.

Referring now to the drawings, there is shown a support base 10 upon which the receiving apparatus is positioned. The receiver includes a printer drum 12, about which is positioned a printing helix 14. The drum is rotated at proper operational speed by means of a motor 16, the motor being supported by a sub-base or support member 18. Driving means, such as a belt 20, supplies power from the motor 16 to the recording drum 12.

The recording drum is supported between two end brackets 22 and 24, the bracket 22 being provided with a bearing, the housing of which is shown at 26, for rotatably supporting the driven end of the recording drum 12. A pulley 28 is attached to this end of the printer drum by means of a shaft, and the belt 20 cooperates with the pulley 28 and with pulley 30 on the shaft of the motor.

The opposite end of the recording drum is rotatably supported by means of a bearing, a portion of which is shown at 32, the bearing being attached to the end bracket 24.

The motor, therefore, in rotating in the direction indicated by the arrow, rotates the printing drum which carries the helix 14. Cooperating with the helix is a printer bar 34, which is supported by the cover member 36 in a manner that will be later described. The paper 40, in normal operating position, is located between the printer bar 34 and the drum and helix 12—14. When a voltage variation is applied between the conducting helix and the printer bar, the potential difference causes current to flow through the impregnated paper, with the result that an electrolytic recording is produced thereon.

In order that the paper may be fed through the receiving apparatus at the proper rate of speed, a feed roller 42 is provided. To provide a drive for the feed roller, one end of the printing drum is supplied with a worm gear 44, which cooperates with pinion 46, the pinion being fastened or secured to a counter-shaft 48. The counter-shaft is, therefore, rotated by means of the worm and gear arrangement, and one end of the counter-shaft is provided with another worm gear 50, which cooperates with pinion 52. The pinion 52 is attached to shaft 54, which carries the feed roller 42. The shaft 54 is provided with an appropriate bearing where it passes through the end wall 24, while the opposite end of the feed roller 42 fits inside an annular member 56, in order that the opposite end of the drive roller may be supported. The bearing 56 is attached to the end wall 22 of the receiving apparatus.

Inasmuch as the paper is moist at the time the recording is produced thereon, it is desirable to dry and iron or smooth the paper after a recording has been made, and for this purpose a drying roller 58 is provided. The drying roller 58 is tubular in form, and is similar in construction to the traction roller 42. The drying roller is driven by means of a worm 60, which is positioned on the counter-shaft 48 at the end thereof opposite the end where the worm 50 is located. The worm 60 cooperates with spur gear or pinion 62, this gear being attached to shaft 64, which in turn rotates the drying roller 58. A bearing 66 is provided for the shaft 64 at the point where it passes through the end wall 24 of the recording apparatus, and the drying cylinder or roller may, for convenience, be attached to the driving shaft 64 by means of a spline arrangement 68. The opposite end of the drying roller 58 is supported by a bearing ring 70, the ring being supported by the end wall 22 of the recorder by means of securing means 72.

It will be observed that the gears 62 and 52 are of different diameters, and that the latter is the larger. Accordingly, and assuming the pitch of the worm gear to be identical in each case, the traction roller 42 will be driven at a rate much slower than the drying roller 58. In practice, the drying roller is normally driven at about twice the rotational speed of the feed roller.

In order to support the printer bar 34, and in order to maintain the paper 40 in contact with the feed roller 42 and in contact with the drying roller 58, a hinged cover member 36 is provided. This cover is hinged on rod 74, which joins the top rear corners of the end walls 22 and 24. In order to securely affix the end walls, additional spacing rods 76 and 77 are provided. The cover member includes end portions 78 and 80, and extending between these end portions are rods 82 and 84. These rods, or shafts, each carry a series of relatively short idler rollers 86 and 88, respectively. The idler rollers 86, which are positioned on the shaft 82, are arranged to cooperate with the surface of the feed roller 42, whereas the idler rollers 88, which are positioned on shaft 84, are arranged to cooperate with the drying roller 58.

In order these idler rollers may bear with proper pressure upon the feed and drying rollers, their support shafts 82 and 84 are mounted in bearings which are supported by means of springs. The rod 82 is, therefore, supported by springs 90 while the rod or shaft 84 is supported by springs 92. When the cover is in its lowered position, as indicated in Figure 1, these springs are stressed by a predetermined amount, in order that a certain degree of pressure will be asserted against the feed roller 42 and the drying roller 58.

The cover also includes, in addition, two guide rods 94 and 96, and these guide rods are supported by the end surfaces 78 and 80 of the cover 36. They are so positioned that when the cover is in its lowered, or closed position, the rods will maintain the paper in firm contact with the helix 14 and printing drum 12. The relationship of these rods with respect to the printer drum 12 is shown in Figure 1. The rods may be fixed, or may be mounted in bearings in order that they may rotate.

It is desirable that the printer bar 34 be resiliently mounted with respect to the printer drum 12 and helix 14, and in view of the fact that recording potentials are applied to the printer bar, it is necessary that the printer bar be insulated with respect to the remainder of the recording apparatus. In normal construction, the printing drum 12 is made of insulating material, or has thereon an insulating surface, while the conducting helix 14 is attached at one or both ends to ground, or to the metallic frame part of the receiver. Recording potentials are then applied to the insulated printer bar. By resiliently mounting the printer bar, it is then possible for the printer bar to follow any slight irregularities in the helix or printer drum 12, to thereby assure proper contact with the paper 40 as it passes between the printer bar and the helix. Furthermore, this resiliency assures substantially uniform pressure of the printer bar against the recording helix throughout its entire length.

The printer bar is supported by an insulating bar or support rod 98, this rod being pivotally mounted and supported by bracket 100. The support bar 98 is attached to the bracket at a single point near the center of the support bar by means of appropriate securing means, such as a screw 102. The ends of the bracket are supported by rivets or other appropriate securing means 104, to the side walls 78 and 80 of the hinged cover member.

This support means permits the printer bar to move vertically about the pivot point 104, and, in order to normally urge the printer bar in the direction of the recording drum, a pair of springs 106 are provided, one end of each of the springs being attached to the cover member, whereas the other ends of the spring members bear against the insulating bar or rod 98 near the ends thereof. Inasmuch as the bar 98 is attached to the support bracket 100 at a single point, the insulating bar, together with the printer bar, are permitted to rotate about the securing means 102, in order to follow any slight irregularities in the printing drum. In order to apply a positive pressure at each end of the printer bar, a pair of adjusting means, such as thumb screws 108, are provided near each end of the printer bar.

The printer bar 34 is attached to the insulating bar 98 by means of a plurality of screws 110, and a semi-resilient and compressible medium 112 is interposed between the printer bar 34 and the insulating bar 98. This compressible material may be in the form of rubber, viscoloid, or other pliable compressible material, in order that slight irregularities in the printer bar may be compensated for by an adjustment of the screws 110. Furthermore, in view of the fact that the printer bar is gradually worn down by the recording action, and in view of the fact that the printer bar may, in fact, enter into the chemical reaction which takes place at the time of recording, some mechanical or chemical erosion of the printer bar is present, and should this erosion not be uniform, it is possible to compensate for the erosion by an adjustment of the screws 110 along the length of the printer bar. Through the use of the compressible material 112, a damping effect is also produced so that the printer bar 34 is prevented from vibrating or resonating at frequencies that might impair the printing or recording.

By so mounting the printer bar, it is possible for either end of the printer bar to move relative to the printer drum, and it is also possible for the printer bar as a whole to move to or from the recording drum. Furthermore, the springs 106 which bear against each end of the printer bar, normally urge the printer bar in the direction of the recording drum by the proper amount, in order that the proper degree of pressure may be applied to the printer bar.

In order to maintain the cover in its closed or operating position, some securing means must be provided. For this purpose, a pair of hooked members 114 are mounted at each side of the cover member near the front thereof. These hooked members pivot about mounting screws 116, and when the cover is in a closed position, the end portion 118 of the hooks cooperates with the spacer bar 77, which is attached to the two end brackets 22 and 24 of the recorder proper. In order to retain the opposite ends of the hooked members in proper relative positions, a spreader rod 120 is provided. To afford a convenient means whereby the hooks may be brought to bear underneath the rod 77, each of the hooked members is provided with an outturned portion 122, by means of which the securing hooks may be rotated about the support screws 116 to retain the cover in its proper position. In order to assist in maintaining the hooks in their securing position, springs 124 are also provided.

From the above, it may be appreciated that, when it is desired to place the recording mechanism in condition for operating, it is only necessary to thread the paper 40 between the feed roller 42 and the rod 74, and then pull the paper forward over all three of the rotating elements, namely the feed roller 42, the printer drum 12 and the drying roller 58. The cover member is then lowered into its operating position, and latched there by means of the latches or hooks 114. This operation causes the idler rollers 86 to press the paper 40 firmly against the feed roller 42. The cover member also forces the paper down into a position such that it may cooperate with the printer drum 12, printer bar 34, and helix 14. This positioning of the paper is accomplished by the rods 94 and 96. At the same time, idle rollers 88 are also brought into cooperative relationship with respect to the drying roller 58. As previously stated, the idler rollers are spring pressed, the tension of the springs being so regulated as to administer the proper amount of pressure on the feed roller 42, and on the drying roller 58. After recording, the paper passes over the drying roller 58, and emerges from the recorder, an inclined surface 126 being provided in order to direct the paper from the recording apparatus.

The pressure of the idler rollers 86 on the feed roller 42 is sufficient to preclude any relative slipping between the feed roller 42 and the paper. The fact that the paper is somewhat moist at this location also facilitates in preventing any relative movement between the paper and the feed roller 42. Accordingly, when the receiver is in operation and the printing drum 12 is rotated by the motor 16 in the direction indicated, the counter-shaft 48, which forms a mechanical coupling between the printer drum 12 and the feed roller 42, determines the rate at which the paper is supplied to the recording electrodes. The feed is, therefore, a direct function of the rotational speed of the recording drum 12 inasmuch as the recording drum and the feed roller 42 are mechanically coupled together.

It is preferable that the recording drum 12 rotate in the direction of the paper movement, since under conditions when too much pressure is applied to the printer bar, the paper may be cut by the helix, in which case an opposite rotation of the printer drum would cause the tear or cut to continue, whereas if the printer drum is continued in direction of movement of the paper, the cut in the paper will not affect further operation of the recording, assuming the undue pressure is relieved.

After the paper emerges from the recording electrodes, it is then passed partially around drying roller 58. The idler rollers 88, which cooperate therewith, afford relatively slight pressure, the amount of pressure being only that necessary to retain the recorded paper in good contact with the drying roller 58.

As pointed out above, the gear 62 is smaller than the gear 52, with the result that the drying roller rotates with a peripheral speed of about twice the speed of progression of the paper through the machine, so that a certain amount of slippage is present between the drying roller 58 and the recorded paper 40. This slippage performs an ironing action, and a source of heat, as will be described later, is applied to the drying roller 58 to drive off any moisture which remains in the paper in order to leave the paper in a smooth, dry condition as it emerges from the receiving apparatus.

The paper 40 may be derived from a supply roll 128, which is positioned at the back of the machine, as indicated in Figure 1. In cases where the supply roll is untreated paper, then a bath must be provided for impregnating the paper prior to its being fed to the recording apparatus. For this purpose a tank 130 is provided, and is supported preferably by the sub-panel 18. This tank 130 contains the recording solution 132, and the recording solution may be any desired chemical solution that will produce the desired recording results in the receiving apparatus. Various examples of recording solutions that may be used for electrolytic recording are described in Solomon Patent No. 2,306,471, issued December 29, 1942. The paper 40 is then passed from the supply roll 28 through the electrolyte bath 132, and from the bath to the feed roller 42. The paper 40 is maintained immersed into the bath by means of a removable frame member, which includes two end brackets 134, one of which is shown in Figure 1. The frame also includes a top spacer rod 136 and a bottom spacer rod 138. The entire frame assembly is removable from the container 130 through an opening 140 provided in the panel 10.

When the machine is threaded, the paper is then merely drawn from the supply roll 128 across the feed roller 42 and drying roller 58, as described above, and after the cover member 36 is closed, the removable frame member is then inserted through the opening 140 into the tank 130, so that the rod 138 immerses the paper 40 into the electrolyte bath 132. The frame member may be retained in this position by means of clips, or other detachable securing means (not shown in the drawings).

Naturally, if the recording is to be made on pretreated or pre-impregnated paper, the bath and frame member may be omitted, and the paper may then be removed from the previously treated supply roll and directed immediately to the recording portion of the receiver. In this case, it is preferable to at least position the supply roller in a closed container, the paper emerging through a relatively narrow slit therein in order to preclude changes in moisture content of the paper due to ambient temperature and humidity conditions. As suggested above, when the paper is derived from a pre-impregnated roll, the entire receiving apparatus may be enclosed in an hermetically sealed compartment, as shown and described in the Young application, supra.

In order that the paper may be observed at the point where the recording is being made, the cover member 36 has provided therein an opening 142, so that the printer bar 38, together with its relationship to the recording paper may be directly seen. This is advantageous, particularly when preliminary adjustments are made in the machine, and particularly when the tension or position of the printer bar 34 is being adjusted, since the results may be immediately observed without waiting an appreciable length of time for the recording to emerge from the machine. Corrections for improper pressure of the printer bar may, therefore, be immediately alleviated.

The window 142 also results in making the cover member 36 lighter in construction, and as a further saving of materials, a second window 144 may be provided in the cover member 36, the second window being located immediately over the feed roller 32. These openings or windows also permit moisture or vapors to escape from the paper as it passes over the feed roller and the drying roller, both of which contain a heating element. A free circulation of air by convection is therefore possible.

Inasmuch as the operation of an electrolytic facsimile receiver depends upon conduction through the paper, it is desirable that the moisture content of the paper be maintained within certain prescribed limits, as suggested above. In order that the moisture content of the paper may be controlled, the feed roller 42 has contained therein a drier, or source of heat, in the form of a resistance element similar to the heater element positioned inside the drying roller 58. Since both of these sources of heat or resistors are identical in construction, only the heating element associated with the drying roller 58 is shown in detail, and this heating element is shown in section in Figure 2. The heating element includes a porcelain or ceramic support bracket 146, which is attached to the end wall 22 of the facsimile receiver by means of screws or other appropriate securing means 148. The resistance element may be in the form of a ceramic cylinder or sleeve 150, having imbedded therein or positioned on the surface thereof a resistance element 152, which is preferably in the form of a resistance wire. The porcelain or ceramic cylinder is then attached to the bracket 146 by means of a rod 154, the rod 154 operating to clamp the cylinder between a block of insulating material 156 and a conducting annular member 160. When the rod or bolt 154 is tightened, the ceramic cylinder carrying the resistance element, is then rigidly supported by means of the bracket 146. It will be noticed from the sectional view of Figure 2 that the drying roller 58 is open at the end that is supported by the bearing annulus 70, so that the heater element may be inserted in that end of the drying cylinder and may be stationarily supported by means of the bracket 146.

Current is supplied to the resistance element of the heater by means of conductor 162, and after passing through the resistance element, it is returned by means of the rod 154 and conductor 164.

As stated above, a similarly constructed heating element is applied to the feed roller 42, and by varying the amount of current supplied to the heater contained within the feed roller 42, the amount of moisture content in the paper at the time it reaches the recording electrodes may be regulated. Control of the amount of heat may be manual, or may be automatic, as shown and described in Shankweiler Patent 2,227,109, issued on December 31, 1940.

It is, therefore, preferable for the paper to emerge from the electrolyte bath 132 with an excessive amount of moisture, since this excessive amount may be reduced by regulation of the heat supplied by the heating unit contained within the feed roller 42. When the moisture content of the paper is so regulated, maximum efficiency of recording may be accomplished by the receiving apparatus.

After the paper has passed between the recording electrodes and a facsimile recording has been made thereon, the paper is still moist and it is desirable that the paper emerge from the recording apparatus in a dry condition. Since the moist paper, in drying, is subject to wrinkling and may not be absolutely flat, it is also desirable that the paper be ironed so that when it emerges from the machine, it will be flat and dry. The ironing roller 58, therefore, accomplishes this purpose, and, as explained above, rotates at a speed about twice the speed of progression of the paper through the recorder. A considerable amount of heat is supplied to the heating element contained within the ironing roller 58, so as to assure complete drying of the paper, and the idler rollers 88 function to retain the recorded paper in proper contact with the surface of the ironing roller or drum 58.

When the facsimile apparatus above described is used as a receiver for signals received from a remote point, some means must naturally be provided for maintaining synchronous operation of the receiver with respect to the transmitter. Normally, synchronizing or framing impulses are transmitted, and these signals, when received at the receiving apparatus, are instrumental in maintaining proper speed and phase conditions. Since the present invention is not concerned with maintenance of either speed or phase, the synchronizing apparatus normally employed at the receiver is not shown.

If, however, the apparatus is to be used with a facsimile duplicator, no synchronizing signals or framing impulses are necessary, since the scanning drum may be directly mechanically connected to the recording drum 12, and may be rotated by the single motor 16. When the apparatus is to be used as a facsimile duplicator, a suitable clutch arrangement and tail stock assembly, such as shown and described, for example, in Artzt application, Serial No. 456,000, filed August 25, 1942, may be used.

Furthermore, a scanning mechanism, such as that shown and described in Blain application, Serial No. 464,094, filed October 31, 1942, may be mechanically driven by means of the countershaft 48.

Through the use of the present invention, it is, therefore, possible to control the amount of moisture contained in the paper at the time that the paper reaches the recording electrodes, and it is also possible to dry the paper after a recording has been placed thereon in order that the paper may emerge from the receiving apparatus in a completely dry form. Furthermore, in view of the fact that the ironing roller or final drying roller rotates at a peripheral speed in excess of the speed of progression of the paper through the machine, an ironing action is produced, and as a result, the paper is ironed flat during the final drying process. The paper, therefore, emerges from the machine in a perfectly flat and dry condition.

Furthermore, by proper regulation of the amount of heat supplied to the heater located within the feed roller, the amount of moisture contained in the paper at the time it reaches the recording electrodes can be controlled within relatively narrow limits.

Although the present invention is shown and described in considerable detail, it is to be understood that various alterations and modifications of design may be made therein without departing from the spirit and scope thereof, and it is desired that any and all such modifications be considered within the purview of the present invention, except as limited by the hereinafter appended claims.

Having now described my invention, what I claim is:

1. In a facsimile receiver of the electrolytic type comprising a feed roller and a drying roller, means for positioning a sheet of moist record receiving paper in contact with the feed roller and the drying roller, means to rotate the feed roller at a relatively slow speed to control the rate of movement of the paper through the receiver, a heater positioned inside the feed roller for supplying heat to the paper to reduce the moisture content thereof to a predetermined value, means for rotating the drying roller, the peripheral speed of the drying roller being in excess of the peripheral speed of the feed roller, and a heater positioned inside the drying roller for supplying heat to the paper after a recording has been made thereon to remove substantially all of the moisture from the paper.

2. In a facsimile receiver of the electrolytic type comprising a feed roller and a drying roller, means for positioning a sheet of moist record receiving paper in contact with the feed roller and the drying roller, means to rotate the feed roller at a relatively slow speed to control the rate of movement of the paper through the receiver, means for rotating the drying roller, the peripheral speed of the drying roller differing from that of the feed roller, and a heater positioned inside the drying roller for supplying heat to the paper after a recording has been made thereon to remove substantially all of the moisture from the paper.

3. In a facsimile receiver of the electrolytic type comprising a feed roller and a drying roller, means to position a sheet of moist chemically treated record receiving paper in contact with the feed roller and the drying roller, means to rotate the feed roller at a relatively slow peripheral speed to thereby control the rate of movement of the paper through the receiver, means to rotate the drying roller, a heater positioned within the drying roller for supplying heat to the paper after a recording has been made thereon to remove substantially all of the moisture from the paper, the peripheral speed of the drying roller being in excess of the peripheral speed of the feed roller whereby the paper may be ironed and smoothed during the removal of the moisture therefrom.

4. In a facsimile receiver of the electrolytic type comprising a feed roller and a hollow cylindrical drying roller, means for positioning a sheet of moist chemically treated record receiving paper in contact with the feed roller and the drying roller, means to maintain the paper in contact with the feed roller with sufficient pressure to prevent relative movement between the feed roller and the paper, means to rotate the feed roller at a relatively slow speed to thereby control the rate of movement of the paper through the receiver, means to maintain the paper in relatively light contact with the drying roller to permit relative movement between the drying roller and the paper, means to rotate the drying roller, and a heater positioned inside the cylindrical drying roller for supplying heat to the paper after a recording has been made thereon to substantially completely dry the paper.

5. In a facsimile recorder of the electrolytic type comprising a feed roller, a pair of recording electrodes and a drying roller, means to position a sheet of moist chemically treated record receiving paper in contact with the feed roller with sufficient pressure to prevent any appreciable relative motion between the feed roller and the paper, means to guide the paper between the recording electrodes, means to further position the paper in contact with the drying roller, means to rotate the feed roller at a predetermined peripheral speed to control the rate of movement of the paper through the recorder, means to rotate the drying roller, and a heater associated with the drying roller for removing substantially all of the moisture from the paper while the paper is in contact with the drying roller and after the paper has been subjected to the action of the recording electrodes.

6. In a facsimile recorder of the electrolytic type comprising a feed roller, a pair of recording electrodes and a drying roller, means to position a sheet of moist chemically treated record receiving paper in contact with the feed roller with sufficient pressure to prevent any appreciable relative motion between the feed roller and the paper, means to guide the paper between the recording electrodes, means to further position the paper in contact with the drying roller with relatively light pressure to permit relative motion between the drying roller and the paper, means to rotate the feed roller at a predetermined peripheral speed to control the rate of movement of the paper through the recorder, means to rotate the drying roller at a peripheral rate of speed in excess of the peripheral speed of the feed roller and in excess of the rate of movement of the paper through the recorder, and a heater associated with the drying roller for removing substantially all of the moisture from the paper while the paper is in contact with the drying roller, the relative motion between the drying roller and the paper operating to iron and smooth the paper as it is dried.

MAURICE ARTZT.